UNITED STATES PATENT OFFICE.

DAVID H. WILSON, OF RIDGEWOOD PARK, NEW JERSEY.

METHOD OF WELDING CAST-IRON.

1,306,295.  Specification of Letters Patent.  Patented June 10, 1919.

No Drawing.  Application filed October 31, 1917. Serial No. 199,430.

*To all whom it may concern:*

Be it known that I, DAVID H. WILSON, a citizen of the United States, and resident of Ridgewood Park, in the county of Bergen and State of New Jersey, have invented certain new and useful Methods of Welding Cast-Iron, of which the following is a specification.

My invention relates to a process of welding cast metal of a brittle nature, particularly cast iron which is not only brittle but often very porous.

The object of my invention is to cause an intimate union between the welding metal and the cast iron or other metal by causing the welding current and metal to physically and perhaps chemically, convert the said cast metal from a brittle to a ductile mass to an appreciable depth, thereby forming a welded joint stronger than would result from a mere surface adhesion.

A further object of my invention is to weld cast iron or other brittle metal without burning it or forming a film that prevents the accomplishment of my process.

The greatest success of my process depends upon a number of factors. One factor of great importance, and upon which success to a large extent depends is the temperature at which the weld is effected. When the temperature is too high the cast iron is burned and slag is formed. When too low the welding metal fails to penetrate the cast iron, and the cast iron fails to reach the proper temperature for the steel to penetrate the pores and interstices in the cast iron structure.

Burning the cast iron creates a film that interferes with my process.

The welding temperature should be such that the welding metal transforms the brittle surface of the cast iron or other metal into a ductile mass, having such tough characteristics as to provide a tough welded joint.

The welding current appears to cause one metal to coalesce with the other, the welding metal perhaps entering the pores and interstices in the cast iron, and perhaps uniting with the granulated structure of the latter. This effect is influenced by the current and voltage which has the effect of carrying one bodily into the other. In cast iron the welding metal may thus be provided with opportunities for adhering to inner surfaces of the structure of the cast iron within the body of the metal, so that the latter acquires to some extent the property of ductility.

The apparatus which I prefer to use in the operation of my process is the apparatus shown in my Patent No. 1,187,409, patented June 13th, 1916, although it may be that other apparatus suitable for arc welding can be used.

It is preferable to connect the welding electrode to the negative pole of the current, and to employ a low voltage current. A generator voltage of 35 with a line drop of 10 volts or so, with an amperage of about 100, regulated to uniformity, provides a temperature with a round electrode of $\frac{7}{32}''$ in diameter to establish the proper welding temperature for some qualities of cast iron. These factors may be varied to suit the cast metal operated upon, and to suit the welding metal employed; and may be varied further to some degree without entirely losing the virtue of my process.

While a welding electrode to supply the welding metal is preferably utilized, it is possible with careful handling to weld by "puddling" the welding metal with a carbon terminal. A ferrite electrode having about .20% carbon and about .60% manganese may be useful for some grades of cast iron. During welding the arc burns out a portion of the carbon and manganese but sufficient remains to provide a tough joint.

Any porous brittle cast metal may be welded by my process although it is particularly effective with cast iron.

Many variations may be made without departing from the spirit of my invention.

What I claim is:

1. The method of welding consisting in causing welding metal to adhere to cast metal by converting the brittle structure of the surface portions of said cast metal into ductile metal by means of an electric arc providing a suitable welding temperature.

2. The method claimed in claim 1 having the welding metal supplied across an arc from a welding electrode.

3. The method claimed in claim 2 having the metal from the electrode carried into the cast metal in a plastic state.

4. The method claimed in claim 3 having manganese in said electrode in excess of the amount burned out in the arc.

5. The method claimed in claim 1 applied to cast iron.

6. The method claimed in claim 2 applied to cast iron.

7. The method claimed in claim 3 applied to cast iron.

8. The method claimed in claim 4 applied to cast iron.

9. The method claimed in claim 2 at a regulated uniform temperature and voltage.

10. The method claimed in claim 6 at a regular uniform temperature and voltage.

DAVID H. WILSON.

Witness:
MYRON F. HILL.